United States Patent

Zhou et al.

Patent Number: 6,127,049
Date of Patent: Oct. 3, 2000

[54] REWRITABLE OPTICAL INFORMATION MEDIUM

[75] Inventors: Guo-Fu Zhou; Bernardus A. J. Jacobs, both of Eindhoven, Netherlands

[73] Assignee: U.S. Philips Corporation, New York, N.Y.

[21] Appl. No.: 09/184,529

[22] Filed: Nov. 2, 1998

[30] Foreign Application Priority Data

Nov. 7, 1997 [EP] European Pat. Off. ............... 97203459

[51] Int. Cl.$^7$ ...................................................... B32B 3/00
[52] U.S. Cl. ...................... 428/641; 428/64.2; 428/64.4; 428/64.5; 428/64.6; 428/913; 430/270.13; 430/495.1; 430/945; 369/283; 369/288
[58] Field of Search ................... 428/64.1, 64.2, 428/64.4, 64.5, 64.6, 457, 913; 430/270.13, 495.1, 945; 369/283, 288

[56] References Cited

U.S. PATENT DOCUMENTS

| 5,191,565 | 3/1993 | Inoue et al. | 369/284 |
| 5,965,229 | 10/1999 | Zhou | 428/64.4 |

*Primary Examiner*—Elizabeth Evans
*Attorney, Agent, or Firm*—Norman N. Spain

[57] ABSTRACT

A rewritable optical information medium has a phase-change recording layer on the basis of an alloy of Ge—Sb—Te, which composition is situated within the pentagonal area PQRST in a triangular ternary composition diagram. These alloys show a complete erase time of 50 ns or less. CET-values below 45 ns are obtained with alloys situated on the tie-line connecting Te and the compound GeSb$_2$Te$_4$ within the area PQRST. Such a medium is suitable for high speed recording (i.e. at least six times the CD-speed), such as for DVD-RAM and optical tape.

8 Claims, 4 Drawing Sheets

REWRITABLE OPTICAL INFORMATION MEDIUM

BACKGROUND OF THE INVENTION

The invention relates to a rewritable optical information medium for high-speed recording by means of a laser-light beam, said medium comprising a substrate carrying a stack of layers, which stack comprises, in this order, a first dielectric layer, a recording layer of a phase-change material comprising an alloy consisting of Ge, Sb and Te, a second dielectric layer and a metal mirror layer.

The invention also relates to the use of such an optical recording medium in high storage density and high data rate applications.

Optical information or data storage based on the phase change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information.

One of the main problems in high speed phase-change optical recording is the required erasing (recrystallization) speed. A high crystallization speed is particularly required in high-density recording and high data rate applications, such as disc-shaped DVD-RAM and optical tape, where the complete crystallization time (complete erase time: CET) has to be shorter than 50 ns. If the crystallization speed is not high enough to match the linear velocity of the medium relative to the laser-light beam, the old data (amorphous marks) from the previous recording cannot be completely removed (recrystallized) during DOW. This will cause a high noise level.

An optical information medium of the type mentioned in the opening paragraph is known from U.S. Pat. No. 5,191,565. The known medium of the phase-change type comprises a disc-shaped substrate carrying a stack of layers consisting, in succession, of a first dielectric layer, a recording layer of a phase-change Ge—Sb—Te alloy, a second dielectric layer and a metal reflective layer. Such a stack of layers can be referred to as an IPIM-structure, wherein M represents a reflective or mirror layer, I represents a dielectric layer and P represents a phase-change recording layer. Said patent discloses in the ternary composition diagram (FIG. 5) a locus of 50 ns pulse times around the stoichiometric compound $GeSb_2Te_4$, at which pulse time the Ge—Sb—Te compositions begin to crystallize. This time is not equal to the complete erase time CET, but shorter. The complete erase time CET is defined as the minimum duration of the erasing pulse for complete crystallization of a written amorphous mark in a crystalline environment, which is measured statically. For complete erasure of an amorphous mark, two processes are necessary, i.e. nucleation and grain (crystallite) growth. The time mentioned in said patent is the nucleation time, i.e. the time that the first crystallites can be observed. Complete erasure, i.e. complete crystallization of the amorphous mark, takes some additional ten or more nanoseconds. Said patent teaches that compositions on the GeTe—$Sb_2Te_3$ tie-line in the ternary diagram crystallize more quickly. E.g. the stoichiometric compound $GeSb_2Te_4$ ($Ge_{14.3}Sb_{28.6}Te_{57.1}$, in atomic percentages) is indicated to have a nucleation time of 40 ns. Experiments by the current Applicant show that this compound has a CET-value of 53 ns.

SUMMARY OF THE INVENTION

It is an object of the invention to provide, inter alia, a rewritable optical information medium which is suitable for high speed optical recording, such as DVD-RAM and optical tape, having a CET-value of 50 ns or shorter. High speed recording is to be understood to mean in this context a linear velocity of the medium relative to the laser-light beam of at least 7.2 m/s, which is six times the speed according to the Compact Disc standard. The jitter of the medium should be at a low, constant level.

These objects are achieved in accordance with the invention by an optical information medium as described in the opening paragraph, which is characterized in that the recording layer comprises an alloy with a composition defined by an area in the ternary composition diagram Ge—Sb—Te, in atomic percentages, said area being of pentagonal shape having the following vertrices:

$Ge_{14.2}Sb_{25.8}Te_{60.0}$ (P)
$Ge_{12.7}Sb_{27.3}Te_{60.0}$ (Q)
$Ge_{13.4}Sb_{29.2}Te_{57.4}$ (R)
$Ge_{15.1}Sb_{27.8}Te_{57.1}$ (S)
$Ge_{13.2}Sb_{26.4}Te_{60.4}$ (T);

the first dielectric layer having a thickness of 70 to (70+λ/2n) nm, wherein λ is the wavelength of the laser-light beam, and n is the refractive index of this layer;

the recording layer having a thickness of 10 to 35 nm;

the second dielectric layer having a thickness of 10 to 50 nm;

the metal mirror layer having a thickness of 60 to 160 nm.

Surprisingly, the alloys within the pentagonal area PQRST in the triangular ternary Ge—Sb—Te composition diagram (See FIG. 1) show a CET of 50 ns or shorter, or even below 45 ns. The compositions of these alloys are situated to the left of the tie-line connecting the compositions GeTe and $Sb_2Te_3$, and show shorter CET-values than the pseudo-binary compound $GeSb_2Te_4$ on this tie-line. This is in contrast with the above-mentioned US patent, which patent teaches that departing from the tie-line GeTe-$Sb_2Te_3$ would increase the nucleation time from 40 ns for the compound $GeSb_2Te_4$ towards 50 ns or more for alloys situated to the left thereof. Outside the area PQRST the CET-values are more than 50 ns.

Especially useful are alloys having a composition: $(GeSb_2Te_4)_{1-x}Te_x$ wherein the molar fraction x satisfies: $0.01 \leq x \leq 0.37$.

These compositions are situated on the tie-line connecting $GeSb_2Te_4$ and Te in the ternary composition diagram, but within the pentagonal area PQRST. Vertex T in FIG. 1 corresponds to a composition in which x=0.37 ($Ge_{13.2}Sb_{26.4}Te_{60.4}$).

In a further refinement of the medium according to the invention, the value of x satisfies: $0.02 \leq x \leq 0.35$. With these values of x, CET-values below 45 ns are obtained.

Examples of compositions which satisfy this formula are $Ge_{14.05}Sb_{28.15}Te_{57.80}$ (x≈0.10) having a CET of 42 ns, and $Ge_{13.75}Sb_{27.40}Te_{58.85}$ (x≈0.22) having a CET of 43 ns.

The first dielectric layer, i.e. the layer between the substrate and the phase-change recording layer, protects the recording layer from humidity and the substrate from thermal damage, and optimizes the optical contrast. To minimize jitter, the thickness of the first dielectric layer is preferably at least 70 nm. In view the of optical contrast, the thickness of this layer is limited to $(70+\lambda/2\ n)$ nm, wherein $\lambda$ is the wavelength of the laser-light beam, and n is the refractive index of the first dielectric layer.

The CET-value of the above-mentioned Ge—Sb—Te alloys depends on the layer thickness of the recording layer. CET decreases rapidly if the layer thickness increases up to 10 nm, and it reaches a value of 50 ns or less if a further increase of the layer thickness takes place. When the recording layer is thicker than 25 nm, CET is essentially independent of the thickness. Above 35 nm the cyclability of the medium is adversely affected. The cyclability of the medium is measured by the relative change of the optical contrast after a large number of DOW-cycles, e.g $10^5$. In every cycle the written amorphous bits are erased by recrystallizing through heating with a laser-light beam while the new amorphous marks are written. In the ideal case, the optical contrast remains unchanged after cycling. The cyclability is practically constant up to a layer thickness of the recording layer of 35 nm. As a result of the combined demands regarding CET and cyclability, the thickness of the recording layer should range between 10 and 35 nm, preferably between 20 and 35 nm, more preferably between 25 and 35 nm. A medium having a recording layer with a thickness between 25 and 35 nm has a constant low jitter during the first $10^5$ DOW-cycles.

An optimum thickness range for the second dielectric layer, i.e. the layer between the recording layer and the metal mirror layer, is found to be between 10 and 50 nm, preferably between 20 and 40 nm. When this layer is too thin, the thermal insulation between the recording layer and the metal mirror layer is adversely affected. As a result, the cooling rate of the recording layer is increased, which leads to a slow crystallization process and a poor cyclability. The cooling rate will be decreased by increasing the thickness of the second dielectric layer.

The CET-value is not sensitive to the thickness of the metal mirror layer if said thickness is in the range from 20 to 200 nm. But if the metal mirror layer is thinner than 60 nm the cyclability is adversely affected because the cooling rate is too slow. If the metal mirror layer is 160 nm or thicker, the cyclability deteriorates further, and the recording and erasing power must be high because of the increased thermal conduction. Preferably the thickness of the metal mirror layer is between 80 and 120 nm.

The first and second dielectric layers may be made of a mixture of ZnS and $SiO_2$, e.g. $(ZnS)_{80}(SiO_2)_{20}$. Alternatives are, e.g. $SiO_2$, $TiO_2$, ZnS, AlN, $Si_3N_4$ and $Ta_2O_5$. Preferably, a carbide is used, like SiC, WC, TaC, ZrC or TiC. These materials give a higher crystallization speed and better cyclability than a ZnS—$SiO_2$ mixture.

For the metal mirror layer use can be made of metals such as Al, Ti, Au, Ag, Cu, Pt, Pd, Ni, Cr, Mo, W and Ta, including alloys of these metals. Examples of suitable alloys are AlTi, AlCr and AlTa.

Both the reflective layers and the dielectric layers can be provided by vapour deposition or sputtering.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 0.6 or 1.2 mm.

Alternatively, the substrate may be in the form of a synthetic resin flexible tape, which is made e.g. from a polyester film. In this way, an optical tape will be obtained for use in an optical tape recorder, which is for example based on a fast spinning polygon. In such a device the reflected laser-light beam makes transverse scans across the tape surface.

The surface of the disc-shaped substrate on the side of the recording layer is, preferably, provided with a servotrack which can be scanned optically. This servotrack is often constituted by a spiral-shaped groove and is formed in the substrate by means of a mould during injection moulding or pressing. This groove can be alternatively formed in a replication process in a synthetic resin layer, for example a UV light-cured layer of acrylate, which is separately provided on the substrate. In high-density recording, such a groove has a pitch e.g. of 0.6–0.8 $\mu$m and a width of 0.5 $\mu$m.

Optionally, the outermost layer of the stack is shielded from the environment by means of a protective layer, for example, of UV light-cured poly(meth)acrylate.

High-density recording and erasing can be achieved by using a short-wavelength laser, e.g. with a wavelength of 675 nm or shorter (red to blue).

The phase-change recording layer can be applied to the substrate by vapour depositing or sputtering of a suitable target. The layer thus deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the Ge—Sb—Te alloy, e.g. 180° C. A synthetic resin substrate, such as polycarbonate, can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

If desired, an additional thin metal layer can be inserted between the substrate and the first dielectric layer, thereby forming a so called MIPIM-structure. Although the structure becomes more complicated, the additional metal layer increases the cooling rate of the recording layer as well as the optical contrast.

The crystallization speed can be further increased when the above materials are used in a stack $II^+PI^+IM$ or $II^+PIM$, where $I^+$ is a carbide, nitride or oxide. Experiments show that the CET of an $II^+PI^+IM$ stack is less than 70% of that of an IPIM stack.

DETAILED DESCRIPTION OF THE INVENTION

Figure 1:
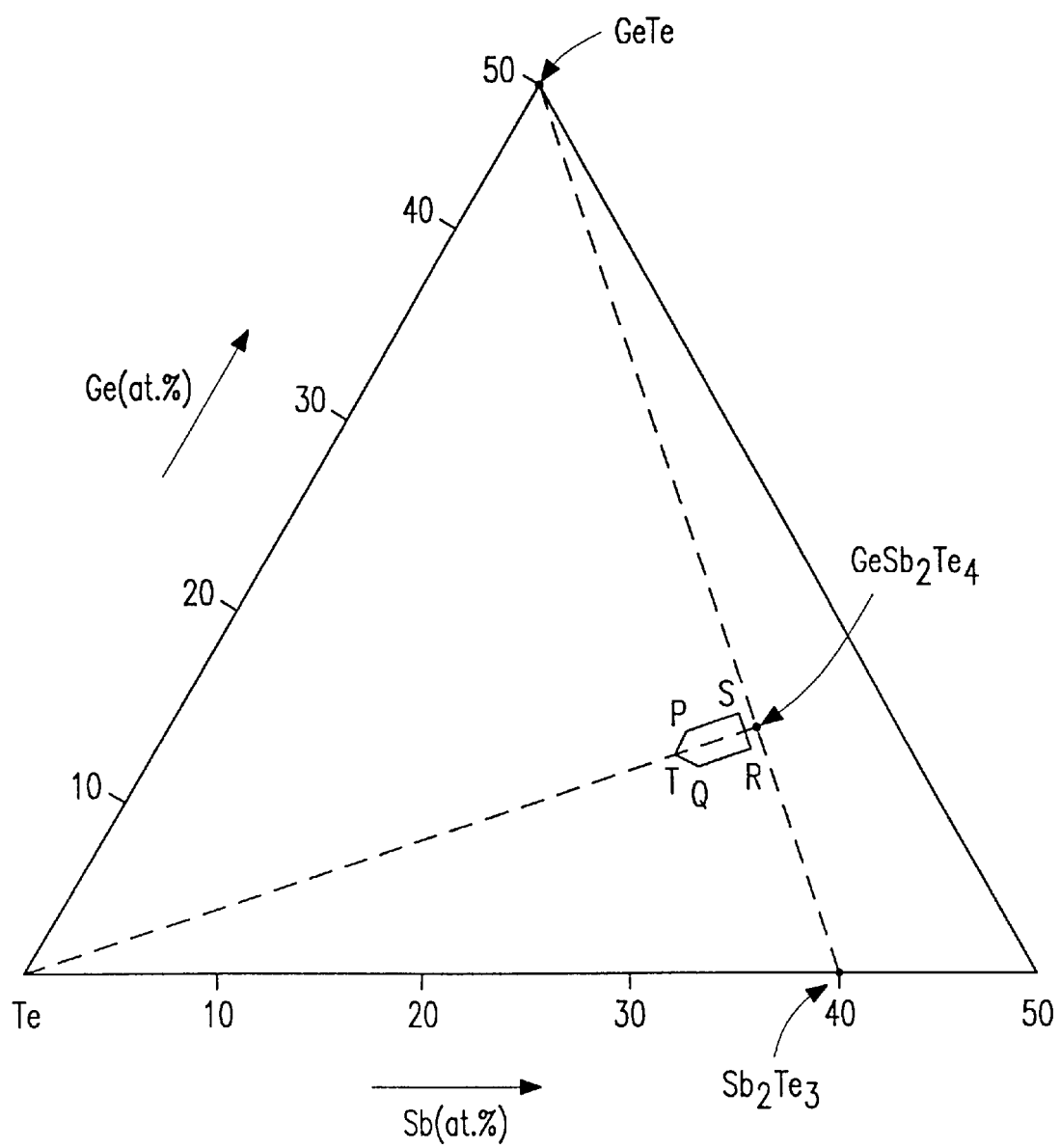
FIG. 1 shows a part of the triangular ternary composition diagram Ge—Sb—Te in atom %.

The invention will now be described in greater detail with reference to the figures of the drawing and the examples that follow.

Examples 1 to 4 (according to the invention).

Figure 2:
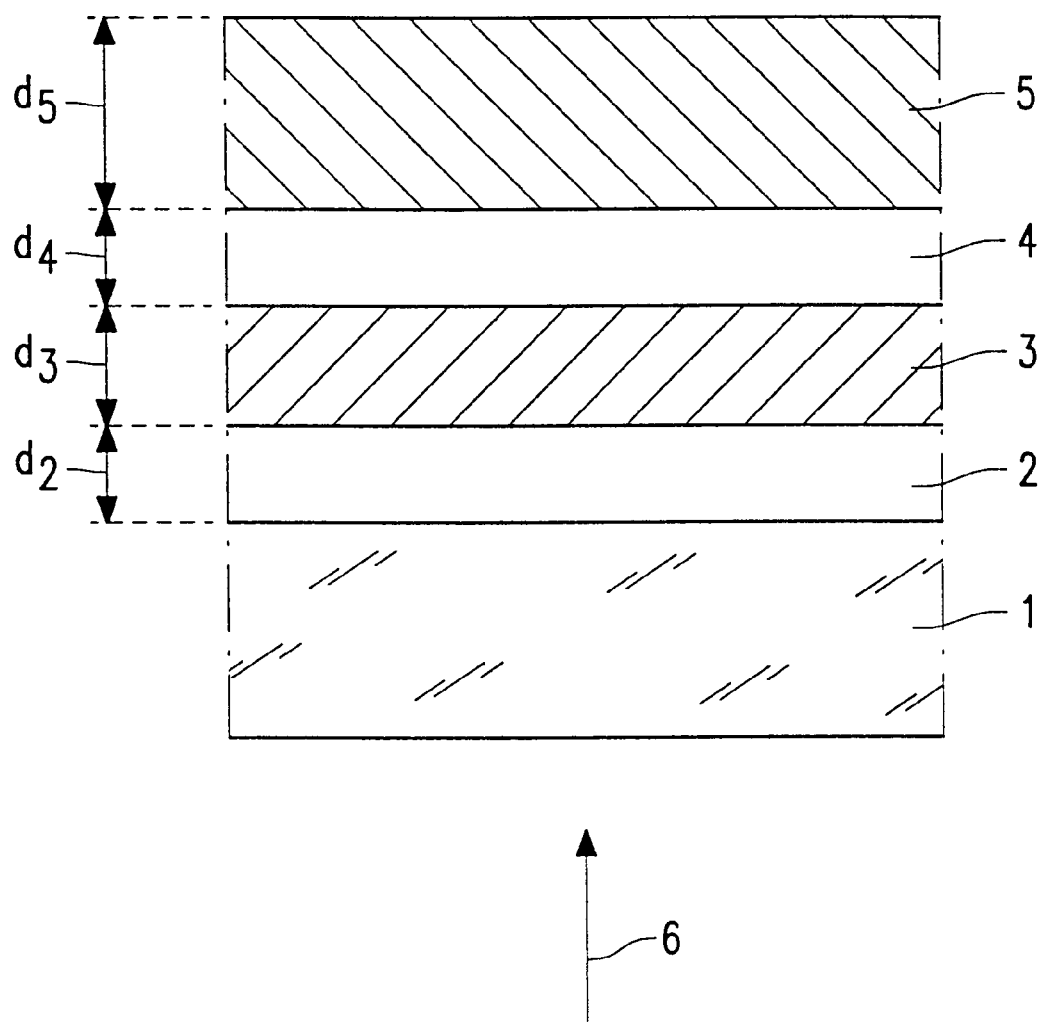
FIG. 2 shows a schematic cross-sectional view of an optical information medium in accordance with the invention.

FIG. 2 schematically shows a part of a cross-section of an optical information disc in accordance with the invention. Reference numeral 1 denotes a polycarbonate disc-shaped substrate having a diameter of 120 mm and a thickness of 1.2 mm. The substrate 1 is provided with an IPIM stack of the following structure:

first dielectric layer (I) 2 of $(ZnS)_{80}(SiO_2)_{20}$ with a thickness $d_2$, recording layer (P) 3 of an alloy of Ge—Sb—Te with a thickness $d_3$, second dielectric layer (I) 4 of $(ZnS)_{80}(SiO_2)_{20}$ with a thickness $d_4$, metal mirror layer (M) 5 of Al with a thickness $d_5$.

All the layers are provided by sputtering. The initial crystalline state of the recording layer 3 is obtained by heating the as-deposited amorphous alloy with a focused laser beam in a recorder.

A laser-light beam for recording, reproducing and erasing of information enters the recording layer 3 via the substrate 1. This beam is schematically represented by arrow 6. The amorphous marks are written with a single laser pulse of power $P_w=1.25 P_m$ ($P_m$=melting threshold power) and duration 100 ns. The erase power is $P_w/2$.

Table 1 summarises the results of examples according to the invention.

TABLE 1

| Example | $d_2$ I (nm) | $d_3$ P (nm) | $d_4$ I (nm) | $d_5$ M (nm) | CET (ns) | Ge (at. %) | Sb (at. %) | Te (at. %) |
|---|---|---|---|---|---|---|---|---|
| 1 | 125 | 27 | 26 | 100 | 45 | 13.65 | 28.85 | 57.50 |
| 2 | 135 | 27 | 26 | 80 | 43 | 13.75 | 27.40 | 58.85 |
| 3 | 125 | 27 | 26 | 100 | 49 | 13.55 | 26.10 | 60.35 |
| 4 | 115 | 27 | 26 | 100 | 42 | 14.05 | 28.15 | 57.80 |

Figure 3:
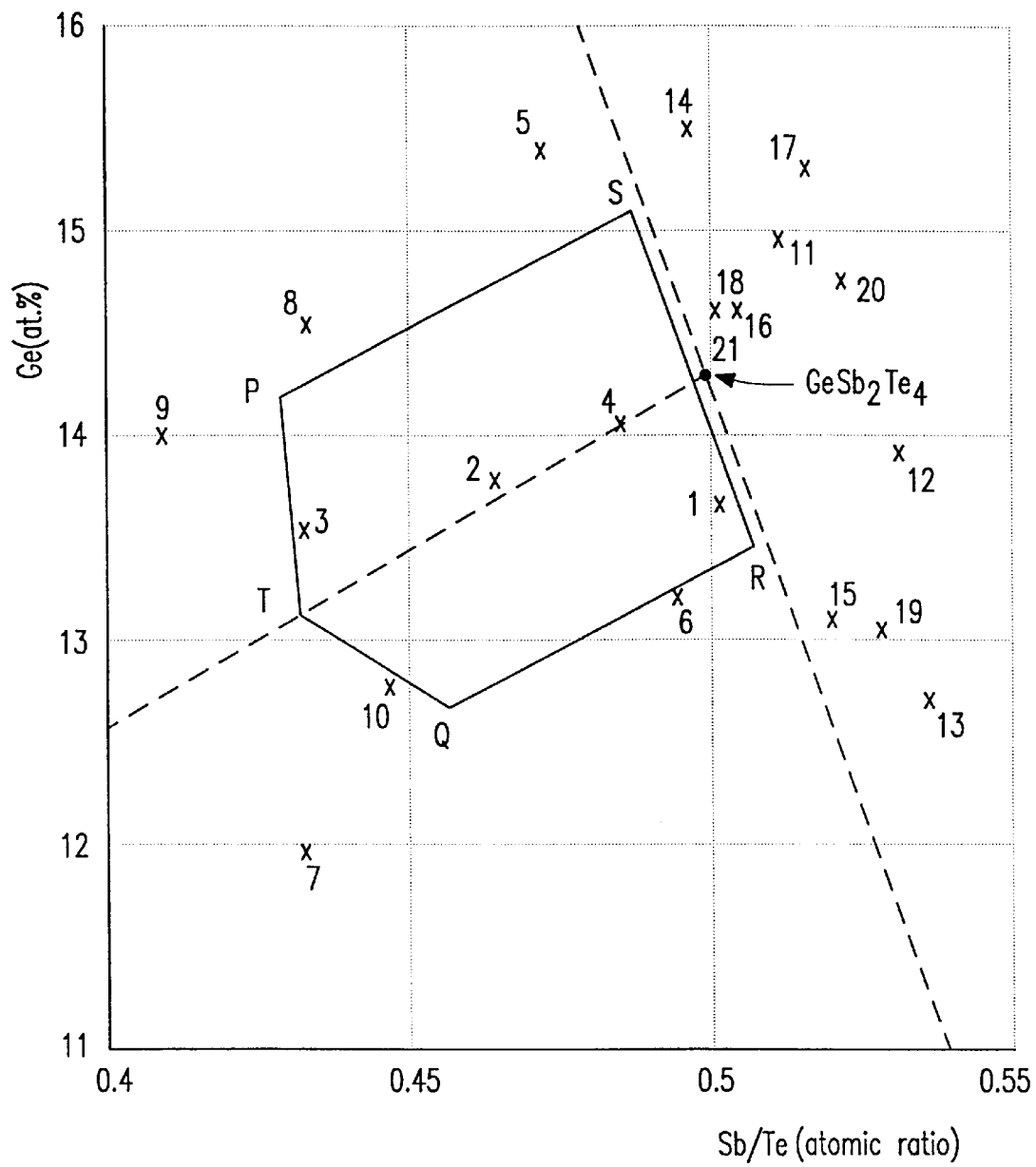
FIG. 3 shows a part of the ternary composition diagram representing Ge (in atom %) and Sb/Te (atomic ratio)

The examples 1 to 4 are situated within the pentagonal area PQRST in FIG. 1 and in FIG. 3. The vertices of the pentagon P, Q, R, S and T represent alloys with compositions as indicated in claim 1. FIG. 1 is a part of the complete triangular ternary composition diagram Ge—Sb—Te. The diagram has the vertices Te (100% Te), the compound GeTe (50% Ge, 50% Te, 0% Sb), and the composition 0% Ge, 50% Sb, 50% Te. The compound $GeSb_2Te_4$ ($Ge_{14.3}Sb_{28.6}Te_{57.1}$ in atomic percentages) is situated on the tie-line (dashed line) connecting the compounds GeTe and $Sb_2Te_3$.

FIG. 3 shows an enlarged composition diagram in a different format. The vertical axis indicates the Ge-content (in at. %), whereas the horizontal axis represents the Sb/Te atomic ratio. This Figure shows a part of the tie-lines from FIG. 1, as well as the compound $GeSb_2Te_4$. Vertex point T is situated on the tie-line connecting Te and $GeSb_2Te_4$. The examples 1 to 4 according to the invention are indicated with a cross x in the area of pentagon PQRST.

Figure 4:
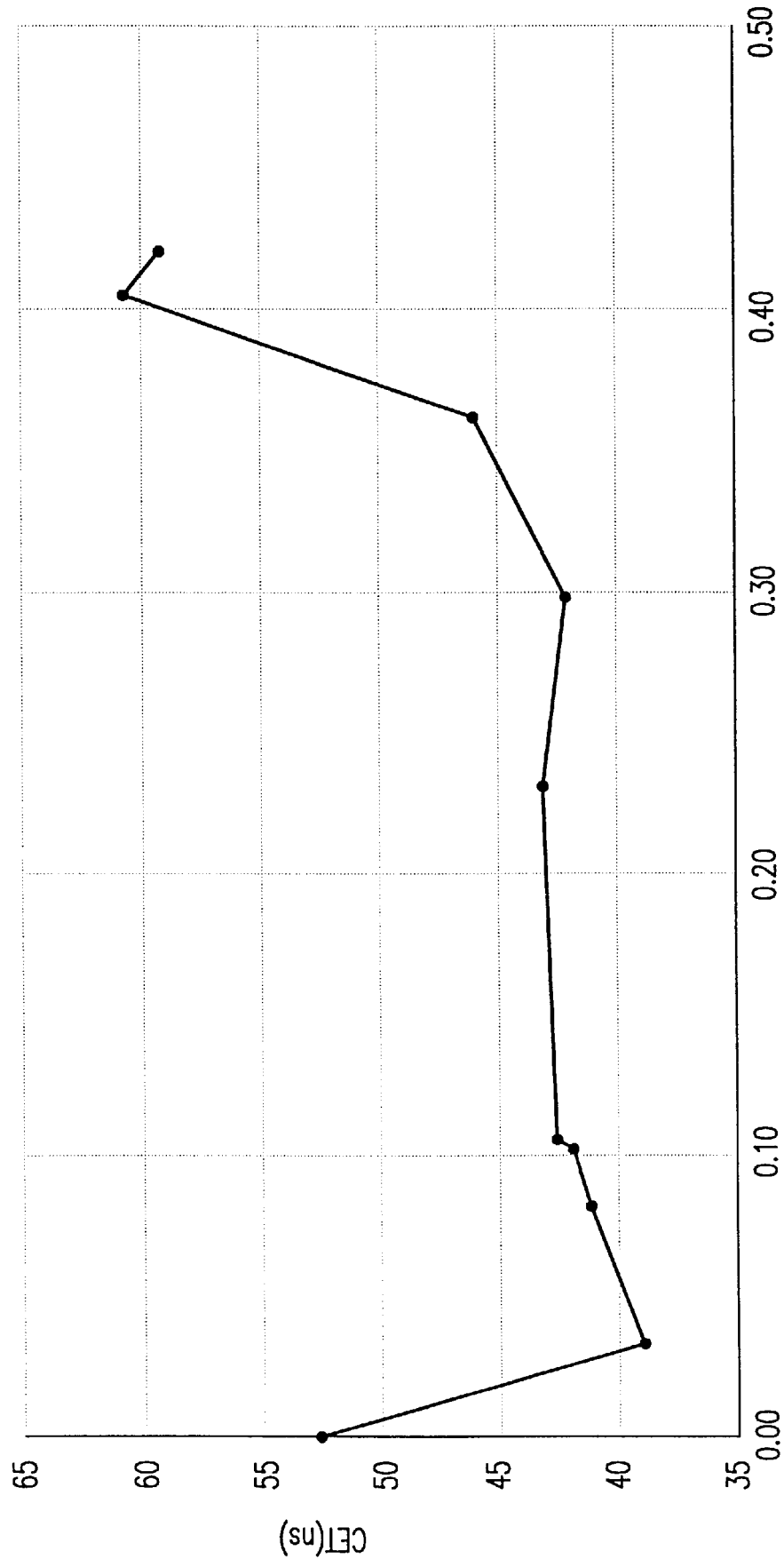
FIG. 4 shows the relation between CET (ns) and x (molar fraction) in the alloy of composition $(GeSb_2Te_4)_{1-x}Te_x$.

The lowest CET-values are situated on the tie-line (dashed line) connecting Te and $GeSb_2Te_4$, but within the area of pentagon PQRST, such as the examples 2 and 4 in Table 1. FIG. 4 shows the influence of the addition of a molar fraction x Te to the compound $GeSb_2Te_4$ ($Ge_{14.3}Sb_{28.6}Te_{57.1}$, in atomic percentages) on CET. By the addition of Te, the composition shifts from $GeSb_2Te_4$ towards Te along the tie-line connecting these two end-points. If x=0.00, i.e. the pure compound $GeSb_2Te_4$, the CET-value amounts to 53 ns. After a small addition of Te (x=0.01), the CET-value drops below 50 ns. CET remains below 50 ns until x=0.37 ($Ge_{13.2}Sb_{26.4}Te_{60.4}$, in atomic percentages), which corresponds to vertex point T in FIGS. 1 and 3. CET remains even below 45 ns, if x is between 0.02 and 0.35. Examples 4 (x=0.10) and 2 (x=0.22) are situated on this tie-line.

Examples 1 to 4 are used for judging the jitter characteristics. Jitter, which is the standard deviation of the difference between the edges of a recorded mark and the position corresponding to the recovered data clock time, is a standard parameter used for judging the cyclability of a disc. Jitter has to be below 12% of the clock time $T_c$, i.e. 30 ns at CD speed (1.2 m/s; clock time 230 ns). Both the leading and trailing edges of the marks are measured. For this experiment, the discs are provided on one side of the substrate with a spiral-shaped servotrack in the form of a groove, and initialized in the recorder. The groove is provided in a UV-light cured layer of acrylate by means of a replication process.

Using a recorder (laser wavelength 650 nm) is found that DOW of random data at a linear velocity up to 18 m/s (15 times CD-speed) it can be successfully performed with these discs. During DOW, new amorphous bits are written and simultaneously the areas between the new amorphous bits are crystallized by the same laser spot. Jitter is found to be essentially constant during DOW, with a value of about 8% of the clock time. This means that a data rate of about 41 MBits/s can be achieved.

Comparative examples 5 to 10 (not according to the invention).

Table 2 summarises the results of examples not according to the invention.

TABLE 2

| Example | $d_2$ I (nm) | $d_3$ P (nm) | $d_4$ I (nm) | $d_5$ M (nm) | CET (ns) | Ge (at. %) | Sb (at. %) | Te (at. %) |
|---|---|---|---|---|---|---|---|---|
| 5 | 125 | 27 | 26 | 100 | 55 | 15.40 | 27.15 | 57.45 |
| 6 | 125 | 27 | 26 | 100 | 52 | 13.20 | 28.75 | 58.05 |
| 7 | 125 | 27 | 26 | 100 | 67 | 11.95 | 26.60 | 61.45 |
| 8 | 125 | 27 | 26 | 100 | 52 | 14.55 | 25.85 | 59.60 |
| 9 | 125 | 27 | 26 | 100 | 69 | 14.00 | 25.00 | 61.00 |
| 10 | 122 | 27 | 26 | 100 | 54 | 12.80 | 26.95 | 60.25 |

These examples show a CET-value higher than 50 ns. The compositions are situated on the left-hand side of the tie-line connecting GeTe and $Sb_2Te_3$, but outside the area of pentagon PQRST, and are indicated with a cross x in FIG. 3.

Comparative examples 11 to 21 (not according to the invention).

Table 3 summarises the results of examples not according to the invention.

TABLE 3

| Example | $d_2$ I (nm) | $d_3$ P (nm) | $d_4$ I (nm) | $d_5$ M (nm) | CET (ns) | Ge (at. %) | Sb (at. %) | Te (at. %) |
|---|---|---|---|---|---|---|---|---|
| 11 | 125 | 27 | 26 | 100 | 66 | 14.95 | 28.80 | 56.25 |
| 12 | 120 | 27 | 26 | 100 | 58 | 13.90 | 29.90 | 56.20 |
| 13 | 130 | 27 | 26 | 100 | 78 | 12.70 | 30.50 | 56.80 |
| 14 | 130 | 27 | 26 | 80 | 61 | 15.50 | 28.05 | 56.45 |
| 15 | 133 | 27 | 26 | 80 | 52 | 13.10 | 29.75 | 57.15 |
| 16 | 125 | 27 | 26 | 80 | 57 | 14.60 | 28.65 | 56.75 |

TABLE 3-continued

| Example | $d_2$ I (nm) | $d_3$ P (nm) | $d_4$ I (nm) | $d_5$ M (nm) | CET (ns) | Ge (at. %) | Sb (at. %) | Te (at. %) |
|---|---|---|---|---|---|---|---|---|
| 17 | 125 | 27 | 26 | 80  | 75  | 15.30 | 28.85 | 55.85 |
| 18 | 125 | 27 | 26 | 100 | 70  | 14.60 | 28.50 | 56.90 |
| 19 | 125 | 27 | 26 | 100 | 83  | 13.05 | 30.10 | 56.85 |
| 20 | 125 | 27 | 26 | 100 | 113 | 14.75 | 29.25 | 56.00 |
| 21 | 125 | 27 | 26 | 100 | 53  | 14.30 | 28.60 | 57.10 |

These examples show a CET-value higher than 50 ns. The compositions of examples 11 to 20 are situated on the right-hand side of the tie-line connecting GeTe and $Sb_2Te_3$, and are indicated with a cross x in FIG. 3. Example 21 corresponds to the compound $GeSb_2Te_4$, which is indicated in FIG. 3.

According to the invention, a rewritable phase-change optical information medium is provided, such a as DVD-RAM or an optical tape, with a CET-value of 50 ns or less, which is suitable for direct overwrite and high-speed recording, and which exhibits good cyclability and little jitter at a linear velocity of 7.2 m/s or more.

What is claimed is:

1. A rewritable optical information medium for high-speed recording by means of a laser-light beam, said medium comprising a substrate carrying a stack of layers, which stack comprises, in this order, a first dielectric layer, a recording layer of a phase-change material comprising an alloy consisting of Ge, Sb and Te, a second dielectric layer and a metal mirror layer, characterized in that the alloy has a composition defined by an area in the ternary composition diagram Ge—Sb—Te in atomic percentages, said area being of pentagonal shape having the following vertices:

$Ge_{14.2}Sb_{25.8}Te_{60.0}$ (P)

$Ge_{12.7}Sb_{27.3}Te_{60.0}$ (Q)

$Ge_{13.4}Sb_{29.2}Te_{57.4}$ (R)

$Ge_{15.1}Sb_{27.8}Te_{57.1}$ (S)

$Ge_{13.2}Sb_{26.4}Te_{60.4}$ (T);

the first dielectric layer having a thickness of 70 to $(70+\lambda/2\,n)$ nm, wherein $\lambda$ is the wavelength of the laser-light beam, and n is the refractive index of this layer;

the recording layer having a thickness of 10 to 35 nm;

the second dielectric layer having a thickness of 10 to 50 nm;

the metal mirror layer having a thickness of 60 to 160 nm.

2. An optical information medium as claimed in claim 1, characterized in that the alloy has the composition:

$(GeSb_2Te_4)_{1-x}Te_x$, wherein the molar fraction x satisfies: $0.01 \leq x \leq 0.37$, preferably $0.02 \leq x \leq 0.35$.

3. An optical information medium as claimed in claim 1, characterized in that the recording layer has a thickness of 20 to 35 nm, preferably 25 to 35 nm.

4. An optical information medium as claimed in claim 1, characterized in that the second dielectric layer has a thickness of 20 to 40 nm.

5. An optical information medium as claimed in claim 1, characterized in that the metal mirror layer has a thickness between 80 and 120 nm.

6. An optical information medium as claimed in claim 1, characterized in that the metal mirror layer comprises at least one of the metals selected from a group consisting of Al, Ti, Au, Ag, Cu, Pt, Pd, Ni, Cr, Mo, W and Ta, including alloys of these metals.

7. An optical information medium as claimed in claim 1, characterized in that the substrate is a disc or a tape.

8. Use of an optical medium as claimed in claim 1, for high-speed recording, whereby the relative velocity between the laser-light beam and the medium is at least 7.2 m/s.

* * * * *